United States Patent
Biegelsen et al.

(10) Patent No.: US 10,987,628 B2
(45) Date of Patent: Apr. 27, 2021

(54) WATER CONTROL IN DIELECTRIC FLUID LAYERS

(71) Applicants: Palo Alto Research Center Incorporated, Palo Alto, CA (US); Xerox Corporation, Norwalk, CT (US)

(72) Inventors: David K. Biegelsen, Portola Valley, CA (US); George A. Gibson, Fairport, NY (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 693 days.

(21) Appl. No.: 15/799,714

(22) Filed: Oct. 31, 2017

(65) Prior Publication Data
US 2019/0126203 A1    May 2, 2019

(51) Int. Cl.
| | |
|---|---|
| B01D 17/06 | (2006.01) |
| B01D 57/02 | (2006.01) |
| B01D 17/02 | (2006.01) |
| G01N 27/06 | (2006.01) |
| G01N 21/51 | (2006.01) |
| G01N 15/00 | (2006.01) |
| C02F 1/00 | (2006.01) |
| H01B 3/20 | (2006.01) |

(52) U.S. Cl.
CPC ......... *B01D 57/02* (2013.01); *B01D 17/0202* (2013.01); *B01D 17/06* (2013.01); *C02F 1/00* (2013.01); *G01N 15/00* (2013.01); *G01N 21/51* (2013.01); *G01N 27/06* (2013.01); *H01B 3/20* (2013.01)

(58) Field of Classification Search
CPC .... B01D 17/06; B01D 17/0202; B01D 57/02; G01N 21/51; G01N 15/00; G01N 15/0205; G01N 27/06; G01N 21/00; G01N 15/0656; G01N 2015/0693; G01N 2015/0053; G01N 2015/0687; C02F 1/00; H01B 3/20
See application file for complete search history.

(56) References Cited

U.S. PATENT DOCUMENTS

| | | | |
|---|---|---|---|
| 6,332,960 B1 * | 12/2001 | Monteith | C02F 1/48 204/571 |
| 2003/0146310 A1 * | 8/2003 | Jackson | B01J 19/088 239/690 |
| 2013/0258344 A1 * | 10/2013 | Mohamed | G01N 21/8507 356/410 |

* cited by examiner

*Primary Examiner* — Cameron J Allen
(74) *Attorney, Agent, or Firm* — Shun Yao; Park, Vaughan, Fleming & Dowler LLP (57) ABSTRACT

A system and method are described for regulating water concentration in a dielectric fluid. The system can comprise electrodes capable of applying an electric field across the dielectric fluid, thereby causing charge carriers and water included in the charge carriers to move toward a respective electrode. The system further includes a trap positioned near the electrodes and comprising a water absorbing material capable of trapping water, thereby reducing the concentration of water in the dielectric fluid. It is also possible to measure properties of the dielectric fluid and use such measurements to control the water-trapping process.

14 Claims, 8 Drawing Sheets

WATER CONTROL IN DIELECTRIC FLUID LAYERS

STATEMENT OF GOVERNMENT-FUNDED RESEARCH

This invention was made with U.S. government support under Contract No. FA8650-15-C-7544 DARPA-A2P-Assembler awarded by the Defense Advanced Research Projects Agency (DARPA) in the Department of Defense. The U.S. government has certain rights in this invention.

BACKGROUND

Field

The present disclosure relates to micro-assembly. More specifically, this disclosure relates to regulating water concentration in a dielectric fluid.

Related Art

Charged particle transport in dielectric fluids is useful for a number of technologies, including micro-electromechanical systems (MEMS), microfluidics, and micro-assembly/micro-fabrication. For example, in micro-assembly a goal is to fabricate functional systems from micro-elements, such as micron-scale computer chips (also called chiplets) with linear dimensions of ~100 μm and thickness ~5 μm, or particles 1-5 μm in diameter.

To facilitate this goal, research has proceeded on a digital micro-assembly printer that can manipulate charged "ink" dispersed in a non-conducting dielectric fluid to "print" circuits or materials. The ink could contain particles or pre-fabricated active electronic devices 1 μm to several hundreds of microns in size (e.g., amplifiers, memories, sensors, or structural or electrical connection elements, such as chiplets). The printer's "image" outputs could be more complex assemblies, such as functional electronic systems (centimeter to meter scale). A micro-assembly printer could enable high performance electronics (e.g., sensor arrays, displays, antennas) which are flexible and quickly fabricated, yet have the complexity of modern integrated circuits. Similarly, with microparticle inks, the printer could enable large customized microstructures, such as metamaterials with unique responses for secure communications, surveillance, and electronic combat.

In such a printer, the charged particles can be dispersed in a dielectric fluid, such as Isopar® and manipulated by an applied electric field, a phenomenon called electrophoresis. Dielectric particles can also be manipulated by forces arising from electric field gradients. Such induced motions are called dielectrophoresis. By tuning the electric field pattern to position, transport, and orient the ink particles, it is possible to engineer micro- and nano-scale systems, such as circuits incorporating chiplets.

In this printing process, the inks acquire their charges by interacting with nanostructures like micelles, whose formation in turn depends on the water concentration in the dielectric fluid. Thus there is a range of water concentration for which successful ink charging and manipulation can be carried out. A minimum concentration of water is required for micelle formation and charge control of inks, whereas a widely-varying water concentration can lead to uncontrolled variation in the system's response. Moreover, if water concentration is too high, micelles may rearrange to screen, and cancel out, the applied electric fields.

SUMMARY

One embodiment described herein provides a method for regulating water concentration in a dielectric fluid. The method comprises applying an electric field via electrodes positioned across the dielectric fluid, thereby causing charge carriers and water included in the charge carriers to move toward a respective electrode. The method then comprises trapping water by using a water absorbing material positioned near the respective electrode, thereby reducing the concentration of water in the dielectric fluid.

In a variation on this embodiment, the charge carriers comprise inverse micelles, non-micellar macromolecular structures, and/or aggregates.

In a variation on this embodiment, the water absorbing material comprises zeolite.

In a variation on this embodiment, the method further comprises measuring an electrical property of the dielectric fluid. The method then comprises determining, based on the measured electrical property of the dielectric fluid, an ionic conductivity and/or a concentration of charge carriers of the dielectric fluid.

In a variation on this embodiment, measuring the electrical property of the dielectric fluid further comprises measuring an electric current in the dielectric fluid corresponding to a known voltage source.

In a variation on this embodiment, the method further comprises measuring an optical property of the dielectric fluid. The method then comprises determining the water concentration based on the measured optical property.

In a variation on this embodiment, measuring the optical property of the dielectric fluid comprises projecting a light toward the dielectric fluid, and measuring light scattered by the dielectric fluid based on Rayleigh scattering.

In a variation on this embodiment, the method further comprises regulating the applied electric field based on a measured property of the dielectric fluid, wherein the measured property corresponds to the water concentration of the dielectric fluid.

In a variation on this embodiment, the dielectric fluid comprises a high-purity synthetic isoparafin fluid.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Dielectric fluids in contact with humid air can absorb water, which can increase the water content in the fluid. Embodiments of the disclosed system solve the problem of dynamically regulating water concentration in a dielectric fluid by trapping water with a sorption element such as zeolite. The system enables regulation of water and charge carriers in electrophoretic systems (e.g., for self-assembly or micro-assembly) and can set the conductivity of an apolar dielectric fluid to a desired value or range. Moreover, the disclosed system and methods can regulate water with no need to replace the dielectric fluid or interrupt the electrophoretic transport or micro-assembly process.

The system can include electrodes for applying an electric field through a dielectric fluid, thereby causing charge carriers and the water included in the charge carriers to move toward a respective electrode. Note that, the system can include more than two electrodes, e.g. an array of electrodes. The system can further include sorption element traps such as a zeolite material and/or another water absorbing material positioned near the electrodes, which can reduce the amount of water and hence the amount of charge carried by the charge carriers. As a result, by controlling the intensity of the applied electrical field, one can control the amount of water removed from the dielectric fluid. The charge carriers may comprise charged inverse micelles, the size of which can be reduced when water is removed by the zeolite, and consequently become less conductive.

In addition, the system can measure properties of the charge carriers, such as conductivity, concentration, size distribution, current, or mobility, and monitor these properties in order to maintain the conductance in a desired window using electrophoretic pumping. Also, by measuring Rayleigh scattering of a laser beam from the charge carriers, the system can determine charge carrier properties such as size distribution and number density. The system can incorporate these measurements as feedback, and can remove water from the dielectric fluid accordingly.

Charge Carriers in a Dielectric Fluid

The disclosed system and methods may be used to regulate water and/or charge carrier concentration in a dielectric fluid. A dielectric fluid is a non-conducting liquid, which may be non-polar (e.g., the isoparaffinic fluid Isopar®, produced by ExxonMobil Corporation). Note that a non-polar liquid typically does not screen charges strongly, and hence permits long-range electrostatic interactions.

A dielectric fluid can contain inverse micelles, which can acquire charges and house enclosed particles, including charged particles. Note that the dielectric fluid can also contain non-micellar macromolecular structures and aggregates. A micelle can include amphiphilic surfactant molecules such as phospholipids like sodium dioctyl sulfosuccinate (also known as Aerosol OT or AOT), arranged in a roughly spherical arrangement. In the case of a polar solvent, the surfactants' hydrophilic ends, usually called "heads," would face outward, while the hydrophobic "tails" face inward.

Figure 1A:
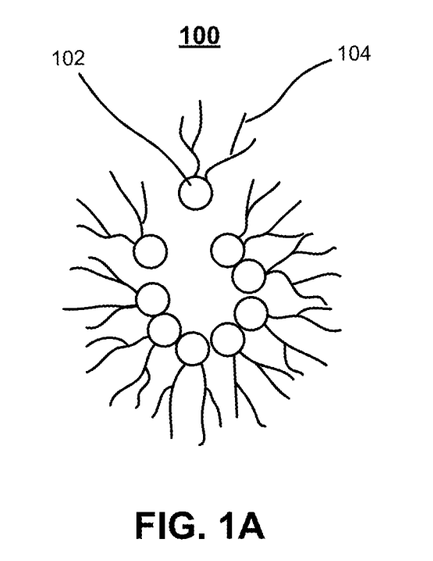
FIG. 1A illustrates formation of an exemplary inverse micelle charge carrier in a dielectric fluid.

In a non-polar solvent like Isopar®, the surfactants arrange in the opposite orientation as "reverse" or "inverse" micelles, so the hydrophobic tails are exposed to the solvent. FIG. 1A illustrates formation of an exemplary inverse micelle charge carrier 100 in a dielectric fluid. Lone surfactant molecule 102 may be energetically unstable, because its hydrophilic head group is exposed to the non-polar liquid. As a result, molecule 102 can lower its energy by joining the growing inverse micelle 100, thus exposing its tail group 104 to the surrounding non-polar liquid, while protecting its head group. This disclosure is mainly concerned with non-polar fluids (such as Isopar®), and therefore the term "micelle" depending on the context, can be used to refer to inverse micelles in non-polar fluids, and the term "charge carrier" is used to refer to inverse micelles as well as a broader array of charge-carrying structures.

Figure 1B:
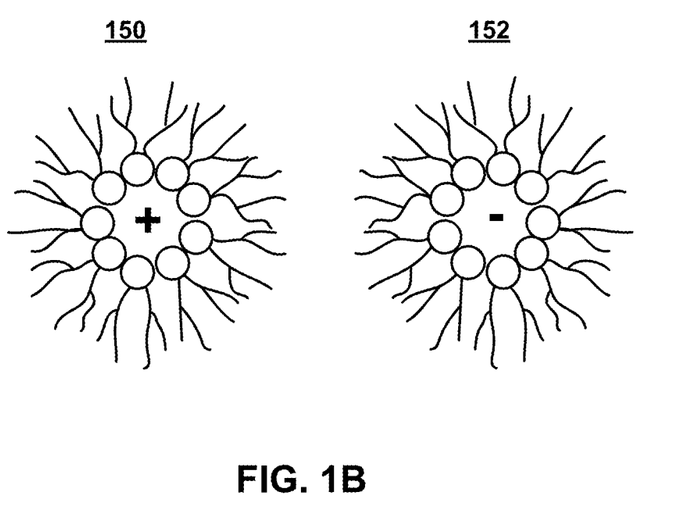
FIG. 1B illustrates exemplary charged inverse micelles.

An inverse micelle can contain particles in its interior (e.g., hydrophilic molecules can be stable in an inverse micelle). Inverse micelles can also acquire a charge. FIG. 1B illustrates exemplary charged inverse micelles. In this example, a pair of inverse micelles 150 and 152 can acquire equal and opposite charges by colliding inelastically and exchanging charge. In thermal equilibrium, the entropy from such charge exchange balances the electrostatic cost. In particular, as temperature T and the dielectric constant κ of the fluid medium increase, a high fraction of inverse micelles acquire charge.

Interaction of micelles with particles dispersed in solution can also induce a charge on the particles (e.g., based on the surface chemistry of the particles). The charged particles can then be electrically manipulated (e.g., toner particles in liquid ink laser printing, electrophoretic display technology, or micro-assembly inks).

Thus, regulating the amount of charge carried by micelles is important to manipulating charged particles. Micelle formation can occur in response to impurities or dopants such as water molecules. In particular, AOT is very hygroscopic (i.e., it readily retains water), so it has been observed that both the molecular weight and radius of micelles increase significantly with the [water]:[AOT] ratio when water is added to a non-polar solvent. Thus, as the water content increases in a dielectric fluid, more water is incorporated into micelles, causing them to grow. Consequently, the amount of charge carried by each micelle can also increase with an increase in the water concentration. Correspondingly, the amount of charge carried by micelles can be controlled by regulating the concentration of water.

Whereas a very pure dielectric fluid may not contain charge carriers, a fluid with micelles and/or charged particles can behave analogously to a doped semiconductor. That is, the fluid with micelles can conduct a controlled amount of current at a given electric field, with a conductivity σ that depends on the number density ρ and mobility μ of charge carriers.

Micelles and charged particles are useful in applications, such as electrophoretic displays, liquid ink electrophtography, micro-electromechanical systems (MEMS), microfluidics, and micro-fabrication/micro-assembly. Specifically, the charged particles can be manipulated by an applied electric field in the dielectric fluid, a phenomenon called electrophoresis. It is also possible for neutral particles to polarize and experience a force in response to a non-uniform field, resulting in transport of the particles. This latter phenomenon is referred to as dielectrophoresis. By utilizing and/or tuning these forces and transport, it is possible to engineer micro- and nano-scale systems, such as circuits incorporating micron-scale microchips (also referred to as chiplets). A digital micro-assembly printer, using "inks" comprising chiplets or micron-scale particles, could enable high performance electronics that are quickly custom fabricated, yet have the complexity of integrated circuits.

These inks, dispersed in a dielectric fluid like Isopar®, can have a charge induced on the suspended particles via interaction with micelles. Micro-assembly can then use electrodes to apply an electric field pattern across the fluid to transport, position, and orient the ink particles into a larger functional assembly. Note the micro-assembly system can use more than two electrodes, e.g. an array of electrodes, in order to provide fine control of ink particles. Such micro-assembly is discussed, e.g., in "Open and closed loop manipulation of charged microchiplets in an electric field" by J. P. Lu, J. D. Thompson, G. L. Whiting, D. K. Biegelsen, S. Raychaudhuri, R. Lujan, J. Veres, L. L. Lavery, A. R. Völkel, and E. M. Chow, *Applied Physics Letters* 105, 054104 (2014), and in U.S. Pat. No. 8,181,336, entitled "MICRO-ASSEMBLER," which are incorporated herein by reference.

The ability to regulate water concentration and consequently the conductivity of the dielectric fluid is therefore crucial to enhancing control of inks in the micro-assembly process, and of the resulting structures and devices. In general, there can be a range of water concentration for which successful ink charging and manipulation can be carried out. A widely-varying concentration of water can lead to uncontrolled variation or non-optimal performance in the system's response. Moreover, if water concentration and the resulting amount of charge per micelle is too high, charge carriers can rearrange to screen, and cancel, the applied field. In conventional systems, controlling water concentration may require an enclosure to inhibit entry of water from the ambient, and replacing the dielectric fluid when water concentration becomes too high. The disclosed system and methods can regulate and remove water without replacing the dielectric fluid.

Conduction in a Dielectric Fluid

As described above, there can be a range of water concentration allowing successful charge control and ink manipulation. The disclosed system can regulate water and hence the amount of charge carried by charge carriers within a desired range, without the need to replace the dielectric fluid, which can interrupt the electrophoretic transport or micro-assembly process.

Figure 2:
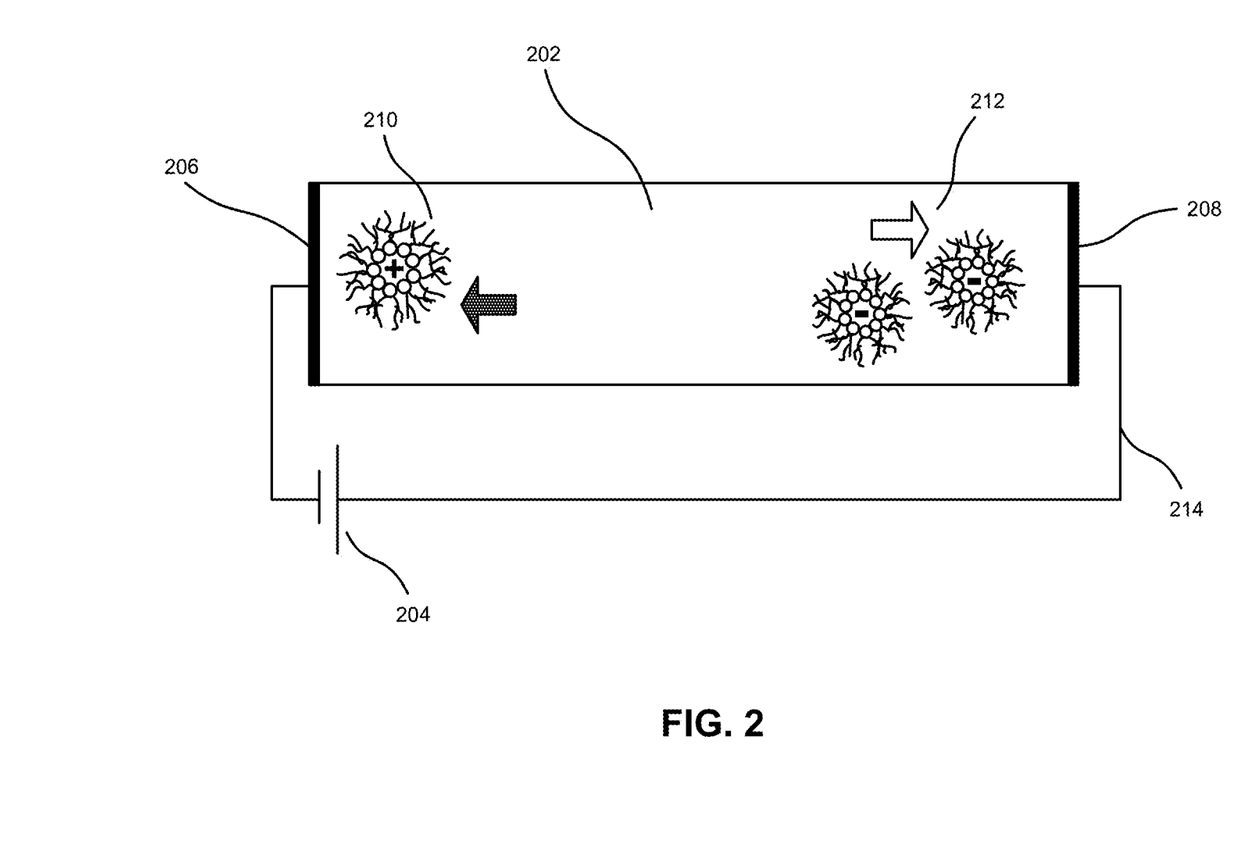
FIG. 2 illustrates drift of charge carriers in a dielectric fluid with an applied electric field, according to an embodiment.

FIG. 2 illustrates drift of charge carriers in a dielectric fluid with an applied electric field, according to an embodiment. In this example, voltage source 204 applies an electric field across dielectric fluid 202 via electrodes 206 and 208. Dielectric fluid 202 can contain two ionic charge carrier types, positively charged carriers 210 and negatively charged carriers 212, which can drift towards electrodes 206 and 208, respectively, under the influence of the field. Controlling the motion of charge carriers in this way can enable manipulation of inks carrying chiplets or other components for micro-assembly, MEMS, or microfluidics applications.

If the net charge of charge carriers in dielectric fluid 202 is too high, the carriers can rearrange in response to the applied electric field so as to screen and cancel it, preventing further current flow. Equivalently, dielectric fluid 202 can be considered as part of a larger current-carrying circuit that includes electrodes 206 and 208 and voltage source 204. That is, an electric current can flow in wire 214 while the ionic current flows in dielectric fluid 202. Electrodes 206 and 208, which form interfaces between dielectric fluid 202 and the circuit, can then behave as capacitors, since ionic charge carriers 210 and 212 accumulate at the interfaces and cannot transmit through conventional wires 214. When these capacitances become fully charged, current may cease to flow. Equivalently, when the net charge of charge carriers is too high in dielectric fluid 202, enough carriers can move near the electrodes to fully screen the applied field.

Adjusting Water Concentration

The disclosed system and methods address this problem by removing water from the dielectric fluid, thereby reducing the amount of charge carried by the charge carriers. In addition, the water-trapping system can measure and reduce water and/or charge concentration, and use such information to regulate the water removal process.

Figure 3:
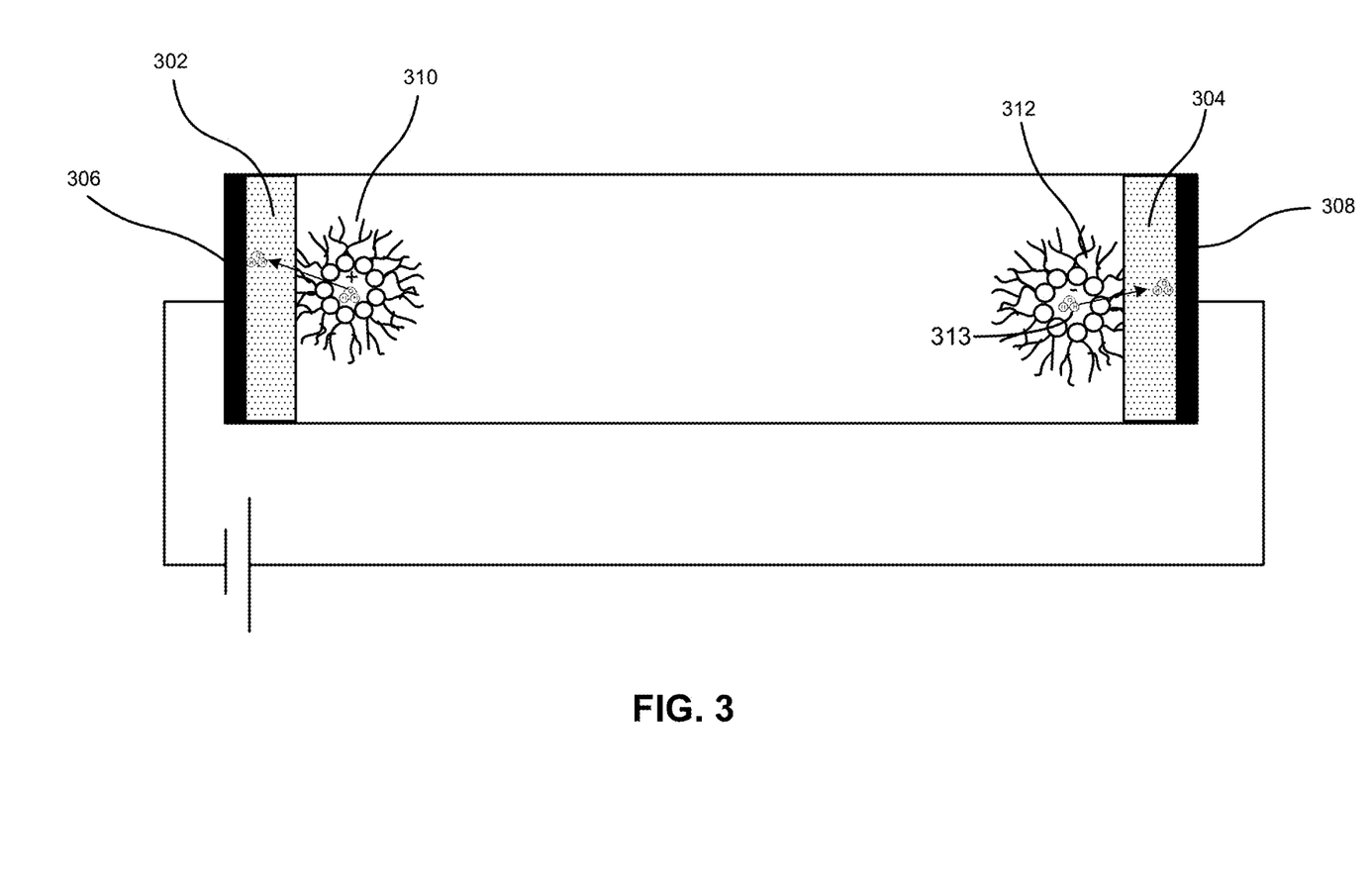
FIG. 3 illustrates an exemplary system for trapping of water associated with charge carriers in a sorption element trap, according to an embodiment.

FIG. 3 illustrates an exemplary system for trapping water associated with charge carriers in a dielectric fluid, according to an embodiment. In this example, the system includes water traps 302 and 304 and associated electrodes 306 and 308, respectively. In the example of FIG. 3, charge carriers 310 and 312 drift toward electrodes 306 and 308, respectively, under the influence of an applied electrical field. The traps can be located adjacent to the electrodes, thereby trapping water when charge carriers move toward the electrodes. In various embodiments, one or more traps can be at any other location in the dielectric fluid, and are not limited by the present disclosure.

As shown schematically, water molecules (such as water molecule 313), water components such as $H^+$, $OH^-$, and hydrated configurations can be removed from within the inverse micelles and trapped by water traps 302 and 304. As a result, when water concentration in the dielectric fluid is reduced, the charge carriers are reduced in size and carry less charge. In general, water traps 302 and 304 may trap water molecules based on any type of sorption or adhesion, including absorption, adsorption, physisorption, ion exchange, and any other type of sorption known in the art. In one embodiment, water traps 302 and 304 can include a zeolite material.

In general, when the voltage across 306 and 308 is increased, the applied electrical field also increases. As a result, the charged micelles experience more force, which pulls them toward the electrodes. Consequently, more water molecules are brought into contact with the water traps and become trapped. As the water concentration reduces, less charge is carried by the micelles, which results in a reduced conductivity of the dielectric fluid. In some embodiments, the system can continue to trap additional water until the water concentration and/or conductivity has been reduced to a desired level or range. Furthermore, by regulating the voltage across the electrodes, one can adjust the rate at which the water is trapped. For example, in the beginning of the water-trapping process, one can apply a higher voltage across the electrodes to obtain a higher water-trapping rate. As the water concentration or conductivity of the dielectric fluid approaches the desired level, the voltage can be reduced to slow down the water-trapping rate, so that one can have a finer control of the water concentration. When the voltage across electrodes 306 and 308 is set to zero or reversed in polarity, the inverse micelles with their reduced water concentration can be returned to the dielectric fluid.

Measuring Conductivity of Dielectric Fluid

As described above, the disclosed system and methods allow for control of trapping water (and therefore of water concentration), for example by adjusting the electric field. In an embodiment, it is also possible to adjust the water concentration in response to measurements of conductivity. This allows the dielectric fluid to be tuned to a desired conductivity range based on an efficient feedback loop. As a result, it is unnecessary to add or replace the dielectric fluid in a micro-fabrication system, as the system can regulate water concentration in the dielectric fluid as needed. Moreover, in some embodiments, the water-concentration adjustment process can be automated (e.g. by controlling the applied field automatically to reduce water concentration) in response to the measurement results.

Figure 4A:
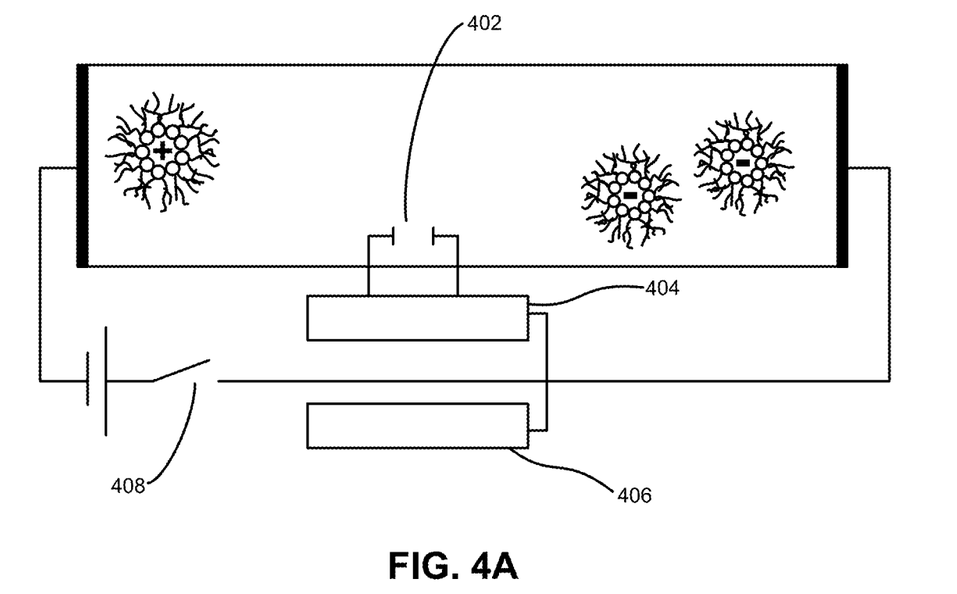
FIG. 4A illustrates an exemplary circuit for determining ionic conductivity of a dielectric fluid with a current sensor, according to an embodiment.

FIG. 4A illustrates an exemplary circuit for determining conductivity of a dielectric fluid with a current sensor, according to an embodiment. In this example, a pair of electrodes 402 is immersed in the dielectric fluid. Electrodes 402 can be connected to current sensor 404, which can be monitored by controller 406 to determine a resistance or conductivity of the dielectric fluid. Controller 406 can control switch or voltage regulator 408 to adjust the applied field, e.g. closing switch 408 in order to trap water and lower the water concentration, or disconnecting switch 408 to slow down or stop the water trapping. In some embodiments, the conductivity can be monitored by a human operator, who can make the decision to activate electrophoretic pumping accordingly.

Figure 4B:
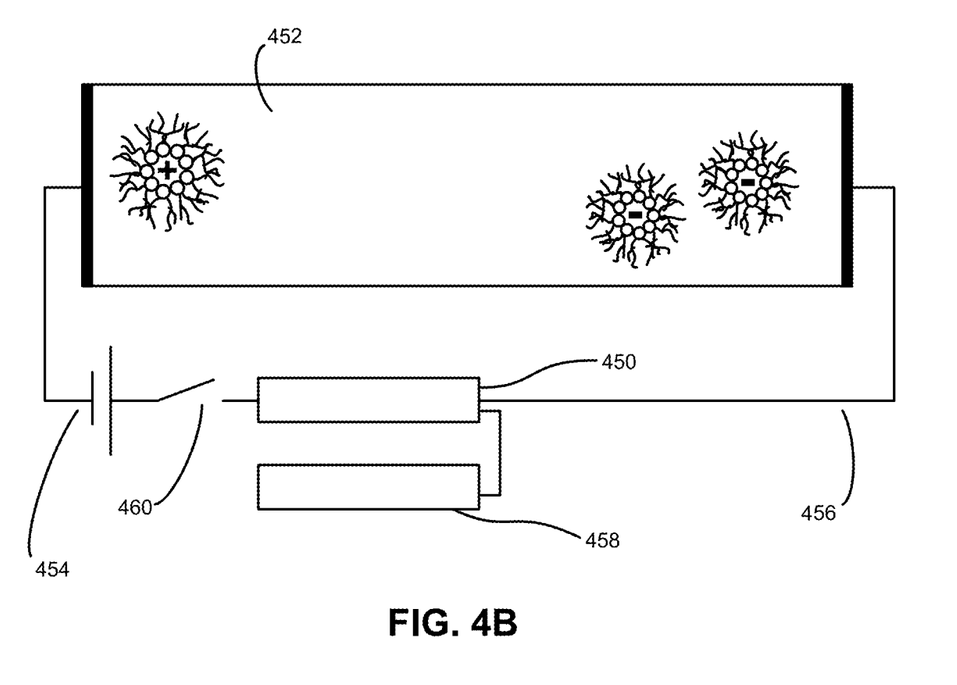
FIG. 4B illustrates an exemplary circuit for determining ionic conductivity with a current sensor in series with the dielectric fluid, according to an embodiment.

FIG. 4B illustrates an exemplary circuit for determining conductivity with a current sensor 450 in series with dielectric fluid 452, according to an embodiment. In this example, current sensor 450 is in series with voltage source 454 driving the charge carrier drift in the dielectric fluid. Current sensor 450 can measure the current in circuit 456 corresponding to the applied voltage 454, which is equal to the current in dielectric fluid 452. Current sensor 450 can be monitored by controller 458, which can control switch or voltage regulator 460 to adjust the applied field.

The example of FIG. 4B shows a simpler current measurement implementation than in FIG. 4A. However, in both cases, the measured current can correspond to the water concentration. If the water concentration is above the desired value, electrophoretic pumping can be activated or increased until the desired value or range is reached. Periodic monitoring of the conductivity, either by the in-series current measurement as in FIG. 4B or by the separate probe as in FIG. 4A, allows the conductivity of the dielectric fluid to be maintained within a desired range.

In some embodiments, the system can determine more detailed properties of the charge carriers, such as size distribution and number density, e.g. by using Rayleigh scattering. For example, an optical method based on Rayleigh scattering can provide information on the particle size distribution (e.g., from the Rayleigh scattering spectrum) and the charge carrier number density (e.g., from the strength of scattering). The optical method moreover does not require additional electric fields, which could interfere with conduction in the dielectric liquid.

Figure 5:
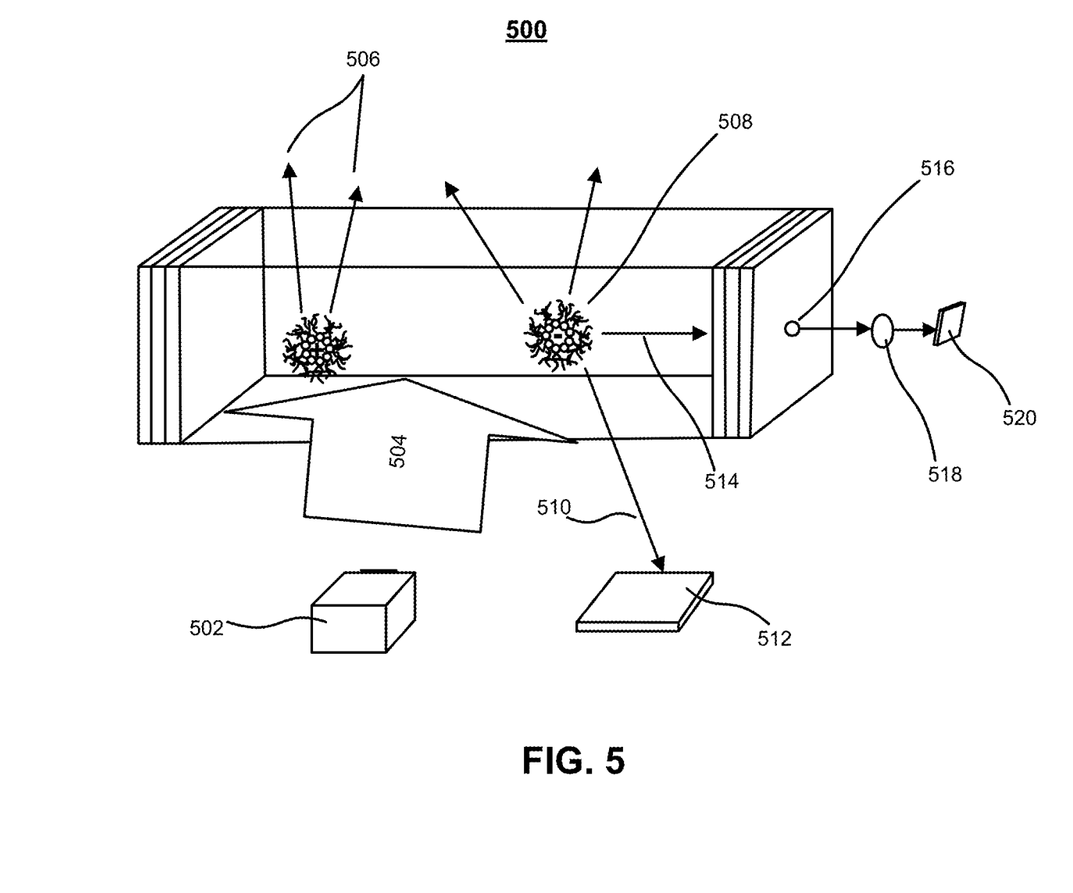
FIG. 5 illustrates an exemplary measurement setup for determining conductivity in a dielectric fluid based on Rayleigh scattering of laser light by charge carriers, according to an embodiment.

FIG. 5 illustrates an exemplary measurement setup 500 for determining conductivity in a dielectric fluid based on Rayleigh scattering of laser light by charge carriers, according to an embodiment. In this example, laser source 502 can produce laser beam 504, which is incident on the dielectric fluid through a transparent case housing the fluid. Laser beam 504 can be scattered from the charge carriers, e.g. by Rayleigh scattering, which produces scattered rays 506 propagating in multiple directions. In particular, the system may be used to measure rays scattered at an angle (i.e., not forward- or reverse-scattered).

In this example, micelle 508 scatters laser beam 504 to produce ray 510, which can be detected by detector 512. Micelle 508 can also scatter laser beam 504 to produce side-scattered rays 514, which can transmit through hole or aperture 516 in the electrode, and anamorphic lens 518, to arrive at detector 520. The measurements can include the intensity and spectrum of the scattered light. From such measurements, the system can determine the concentration and size distribution of micelles or other charge carriers, providing information on the conductivity and other properties of the dielectric fluid.

The system can further use the collected information based on Raleigh scattering to regulate water concentration. If the water concentration is determined to be too high, the system can reduce the concentration by activating electrophoretic pumping and trap water using mechanisms described above.

Regulating Water Concentration and Determining Conductivity

Figure 6A:
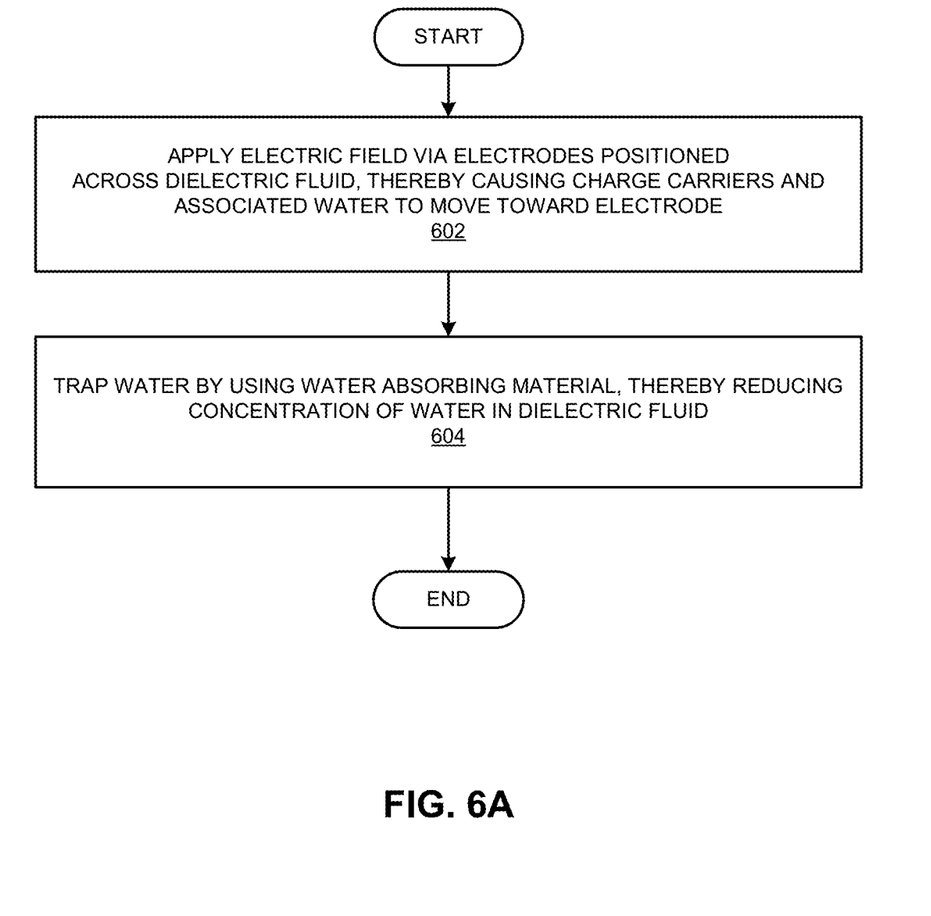
FIG. 6A presents a flowchart illustrating an exemplary method for regulating water concentration in a dielectric fluid, according to an embodiment.

FIG. 6A presents a flowchart illustrating an exemplary method for regulating water concentration in a dielectric fluid, according to an embodiment. First, an electric field is applied via electrodes positioned across the dielectric fluid, thereby causing charge carriers and associated water to move via electrophoretic pumping toward a respective electrode (operation 602). Then water can be trapped in a water trap comprising a sorption element (e.g., zeolite), thereby reducing the concentration of water in the dielectric fluid (operation 604).

Figure 6B:
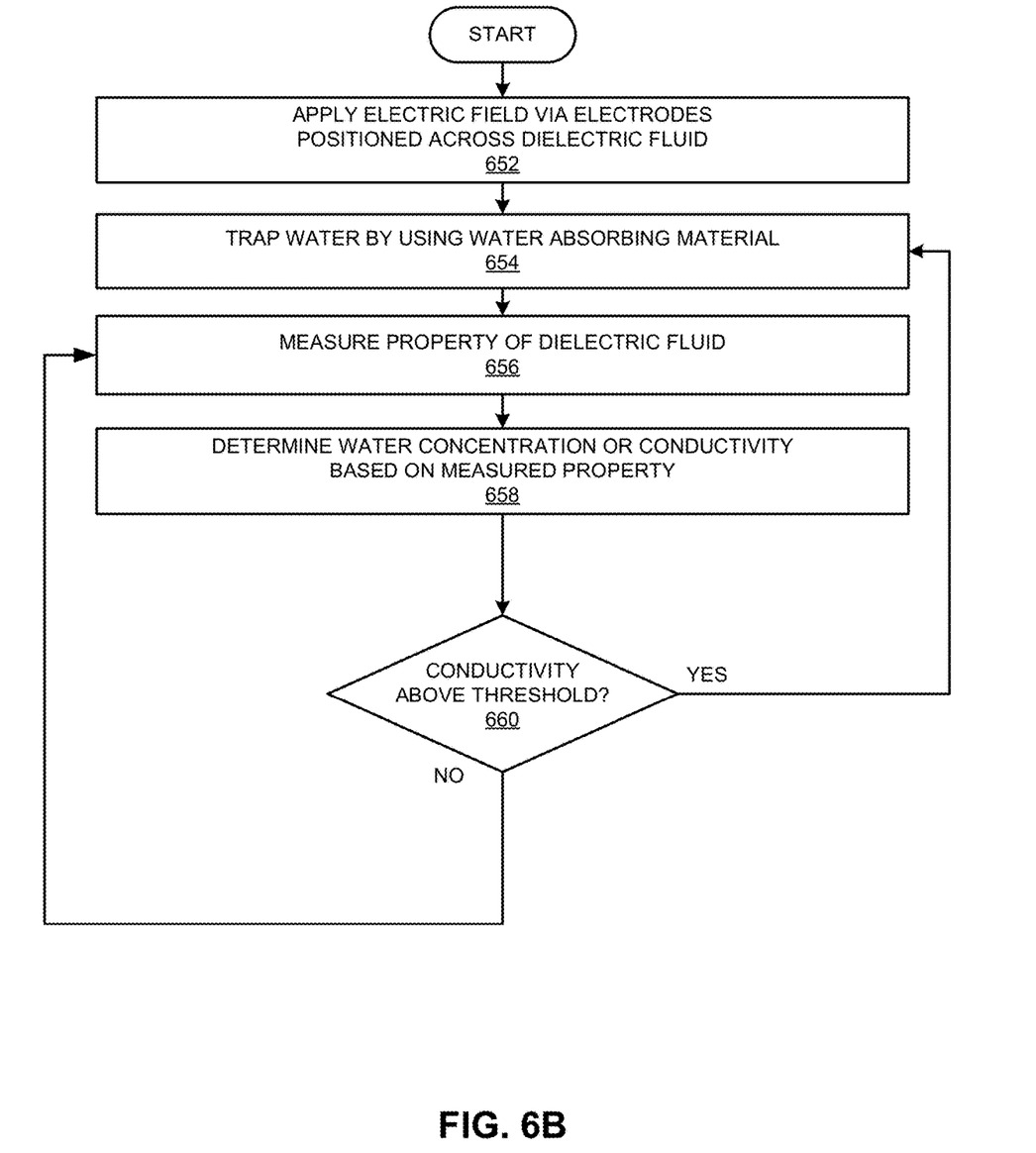
FIG. 6B presents a flowchart illustrating an exemplary method for determining conductivity of a dielectric fluid, according to an embodiment.

FIG. 6B presents a flowchart illustrating an exemplary method for determining conductivity of a dielectric fluid, according to an embodiment. First, an electric field is applied via electrodes positioned across the dielectric fluid (operation 652), causing charge carriers and associated water to move toward a respective electrode. Then water is trapped by using a water absorbing material (operation 654). Next, a property of the dielectric fluid is measured (operation 656). The property can include a current intensity, and/or a concentration and size distribution of the charge carriers. Then, the water concentration or the conductivity of the dielectric fluid is determined based on the measured property (operation 658).

Next, it is determined whether the conductivity or water concentration is above a threshold (operation 660). Responsive to conductivity or water concentration being above the threshold operation 654 can be repeated, i.e. additional water can be trapped in the sorption element trap, in order to reduce the concentration of water further. Responsive to conductivity or water concentration not being above the, the system can terminate the process, or continue to monitor the properties of the dielectric fluid.

Exemplary Computer System

Figure 7:
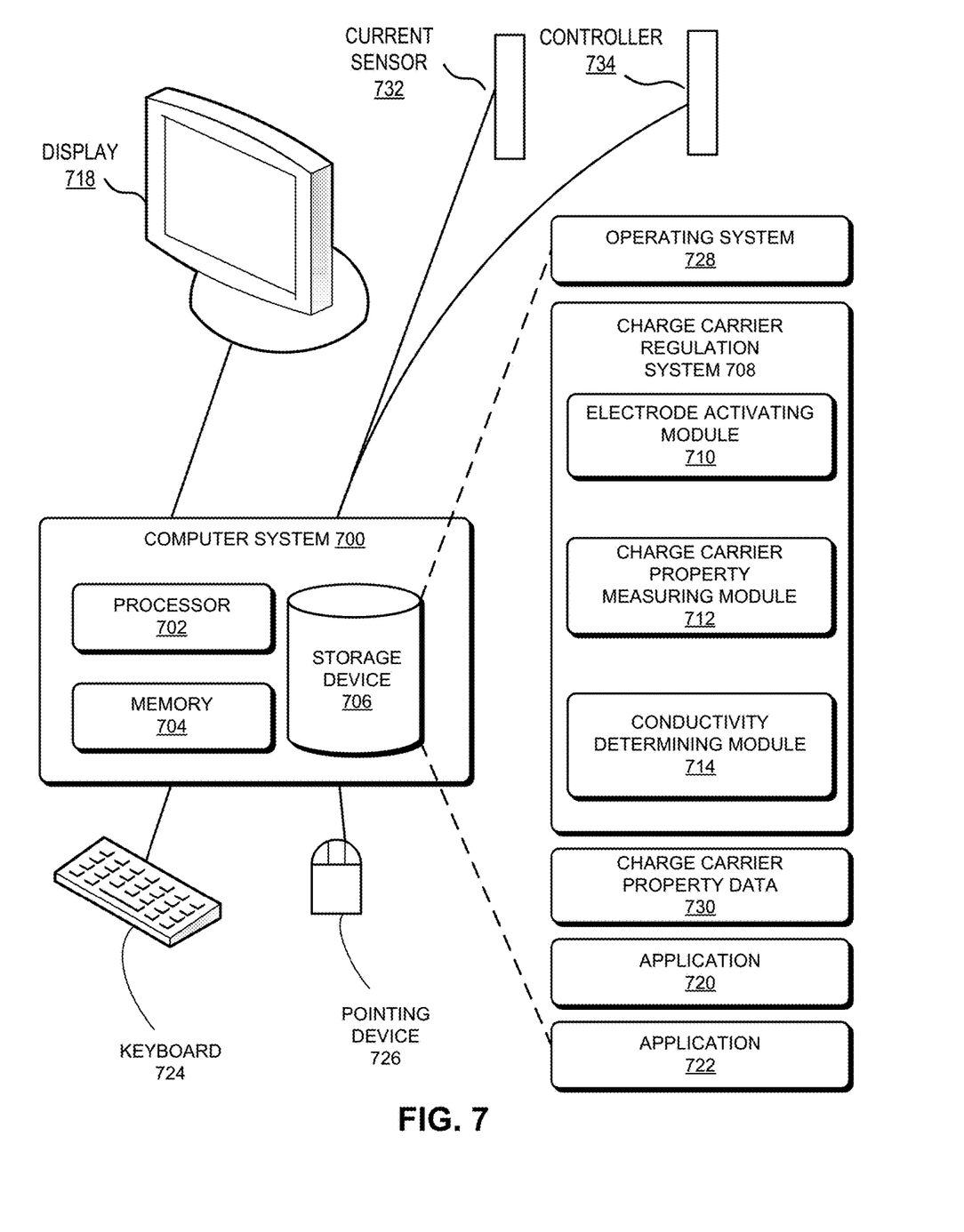
FIG. 7 illustrates an exemplary computer system for regulating water concentration in a dielectric fluid, according to an embodiment.

FIG. 7 illustrates an exemplary computer system for regulating water concentration in a dielectric fluid, according to an embodiment. System 700 may couple to current sensor 732 and controller 734. In some embodiments, system 700 includes a processor 702, a memory 704, and a storage device 706. Storage device 706 may store a number of applications, such as operating system 728 and applications 720 and 722.

Storage device 706 also stores charge carrier regulating system 708, in accordance with embodiments of the present invention. System 708 can comprise a plurality of modules which may communicate with one another. System 708 may be integrated in a computer system such as 700, or realized as a separate device which is capable of communicating with other computer systems and/or devices. Specifically, system 708 can comprise an electrode-activating module 710, a charge carrier property-measuring module 712, a conductivity-determining module 714, and a water pump-activating module 716. System 700 and/or current sensor 732 may receive charge carrier property data 730, comprising measurement data, and may copy the data to a memory section accessible to charge carrier regulating system 708. During operation, one or more applications, such as charge carrier regulating system 708, are loaded from storage device 706 into memory 704 and then executed by processor 702. While executing the program, processor 702 performs the aforementioned functions. System 700 may be coupled to a display 718, a keyboard 724, and a pointing device 726, as well as to hardware such as current sensor 732 and controller 734.

In some embodiments, electrode-activating module 710 and controller 734 can activate an electrode in order to trap water molecules. Charge carrier property-measuring module 712 may obtain a charge carrier property measurement, e.g. from current sensor 732. Conductivity-determining module 714 may analyze the charge carrier property measurement and determine conductivity of the dielectric fluid.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and systems described herein can also be integrated into hardware modules or apparatus. These modules or apparatus may include, but are not limited to, an application-specific integrated circuit (ASIC) chip, a field-programmable gate array (FPGA), a system on a chip (SoC), and/or other circuit devices now known or later developed. When the hardware modules or apparatus are activated, they perform the circuit functions included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for regulating water concentration, the system comprising:
    a dielectric fluid;
    at least a pair of electrodes configured to apply an electric field across the dielectric fluid, thereby causing charge carriers and water included in the charge carriers to move toward a respective electrode; and
    a pair of water-traps separated from each other by the dielectric fluid, wherein each water-trap is positioned adjacent to a corresponding electrode and comprises a water absorbing material capable of trapping water, thereby reducing the concentration of water in the dielectric fluid.

2. The water concentration regulating system of claim 1, wherein the charge carriers comprise inverse micelles, non-micellar macromolecular structures, and/or aggregates.

3. The water concentration regulating system of claim 1, wherein the water absorbing material comprises zeolite.

4. The water concentration regulating system of claim 1, further comprising:
    a measuring probe configured to measure an electrical property of the dielectric fluid;
    an adjustment mechanism configured to adjust the electric field applied via the electrodes based on the measured electrical property of the dielectric fluid.

5. The water concentration regulating system of claim 4, further comprising a voltage source configured to apply a predetermined voltage to the dielectric fluid, and wherein measuring the electrical property of the dielectric fluid further comprises measuring an electric current in the dielectric fluid corresponding to the predetermined voltage.

6. The water concentration regulating system of claim 1, further comprising:
    a measuring probe capable of measuring an optical property of the dielectric fluid;
    a concentration determining mechanism configured to determine the water concentration of the dielectric fluid based on the measured optical property.

7. The water concentration regulating system of claim 6:
    further comprising a light source capable of projecting a light toward the dielectric fluid; and
    wherein the measuring probe is further configured to measure light scattered by the dielectric fluid based on Rayleigh scattering.

8. An apparatus for regulating water concentration in a dielectric fluid, the apparatus comprising:
    a container enclosing the dielectric fluid;
    a pair of electrodes configured to apply an electric field across the dielectric fluid, thereby causing charge carriers in the dielectric fluid and water included in the charge carriers to move toward a respective electrode; and
    a pair of water-traps separated from each other by the dielectric fluid, wherein each water-trap is positioned adjacent to a corresponding electrode and comprises a water absorbing material capable of trapping water, thereby reducing the concentration of water in the dielectric fluid.

9. The apparatus of claim 8, wherein the charge carriers comprise inverse micelles, non-micellar macromolecular structures, and/or aggregates.

10. The apparatus of claim 8, wherein the water absorbing material comprises zeolite.

11. The apparatus of claim 8, further comprising:
a measuring probe configured to measure an electrical property of the dielectric fluid;
an adjustment mechanism configured to adjust the electric field applied via the electrodes based on the measured electrical property of the dielectric fluid.

12. The apparatus of claim 11, further comprising a voltage source configured to apply a predetermined voltage to the dielectric fluid, and wherein measuring the electrical property of the dielectric fluid further comprises measuring an electric current in the dielectric fluid corresponding to the predetermined voltage.

13. The apparatus of claim 8, further comprising:
a measuring probe capable of measuring an optical property of the dielectric fluid;
a concentration determining mechanism configured to determine the water concentration of the dielectric fluid based on the measured optical property.

14. The apparatus of claim 13:
further comprising a light source capable of projecting a light toward the dielectric fluid; and
wherein the measuring probe is further configured to measure light scattered by the dielectric fluid based on Rayleigh scattering.

* * * * *